Patented Sept. 20, 1938

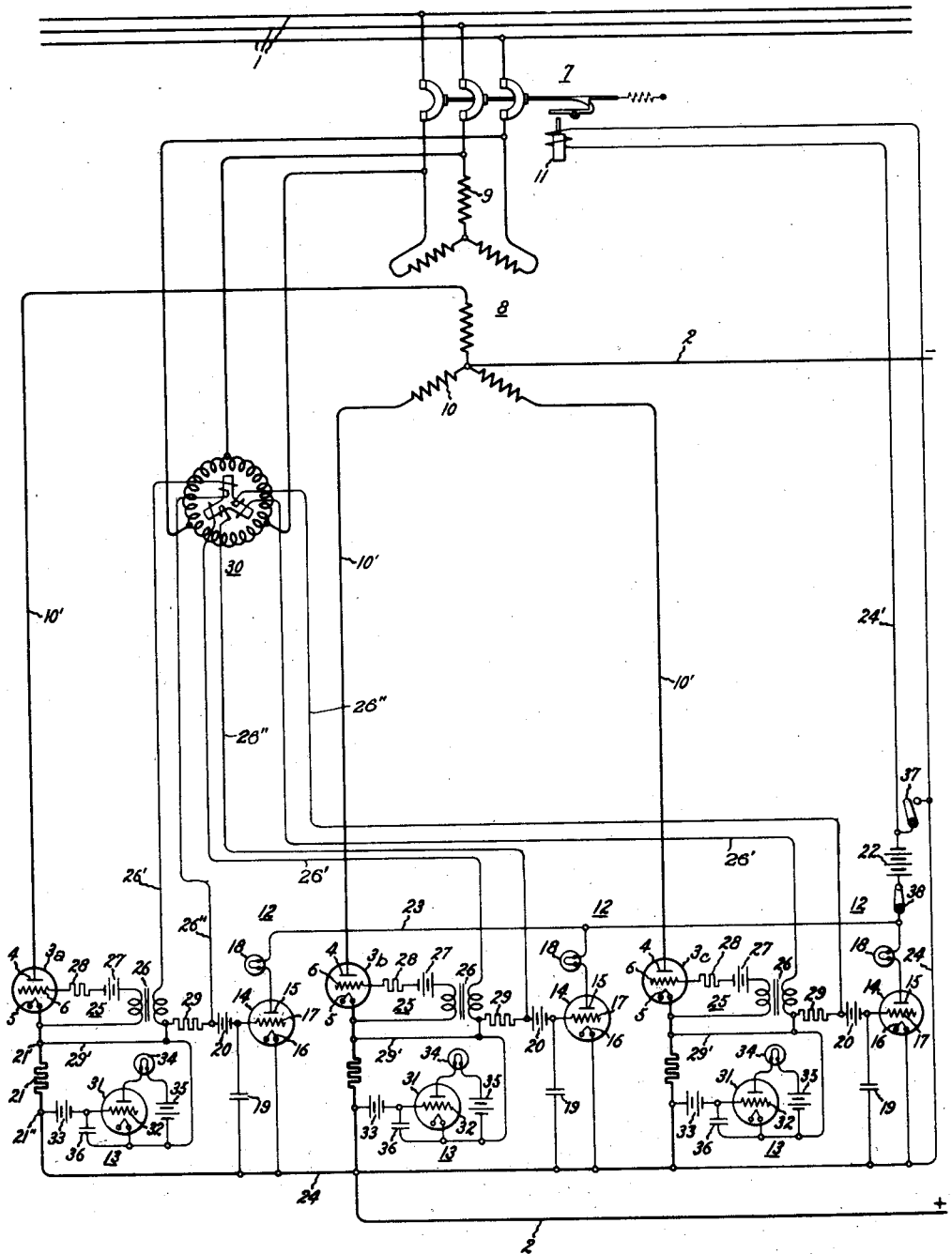

2,130,429

UNITED STATES PATENT OFFICE 2,130,429

ELECTRIC VALVE CIRCUITS

Kenneth H. Kingdon, Schenectady, N. Y., assignor to General Electric Company, a corporation of New York Application January 30, 1936, Serial No. 61,517

7 Claims. (Cl. 177—311)

My invention relates to electric circuits and more particularly to controlling and indicating circuits for electric systems employing electric valves.

In electric systems in which electric valves are employed, and particularly electric systems for transmitting energy between alternating current and direct current circuits, it is frequently desirable to provide means for controlling the associated electric circuits in response to the condition of the electric valves. With the increased application of electric valves for power purposes, it has become apparent that it is highly desirable to have auxiliary control circuits associated with the electric valves which may operate to indicate the condition of operation of the electric valves or which may be employed to control the electric valves or the associated electric circuits in response to any predetermined abnormal condition of operation. It is further evident that these control or indicating systems must not only afford simple and reliable operation but must also afford an accurate and precise indication of the particular electric valve to experience an abnormal condition. In controlling and indicating circuits of this nature, which are intended to be responsive to abnormal electrical conditions which may occur in rapid succession, it is evident that these circuits must be inherently capable of responding to these conditions without involving an appreciable time lag.

It is an object of my invention to provide an improved circuit for indicating an operating condition of an electric circuit or device.

It is another object of my invention to provide a control and indicating system for electric devices which will function to control the electric device or to afford an indication in response to a departure from a predetermined mode of operation, or in response to an abnormal operating condition of the device.

It is a further object of my invention to provide a control and indicating system for electric valves which will function to control the electric valves and the associated circuits or to afford an indication in response to a departure from a predetermined mode of operation.

In accordance with the illustrated embodiment of my invention, an indicating and control system is associated with electric valves, preferably of the vapor electric type, to control an associated circuit or to afford an indication of the operating condition or change in an operating condition of the electric valves. More particularly, an auxiliary control or indicating circuit is associated with the control member of an electric valve to control the conductivity of said valve and which is responsive to an abnormal condition of the electric valve. The auxiliary control and indicating circuit is provided with means, such as an electric valve, which is normally maintained inoperative or nonconductive during normal operation of the main electric valve, and which is rendered conductive to control the associated main electric circuit or to afford an indication of the operating condition upon the occurrence of an abnormal condition of the main electric valve. In one arrangement, the auxiliary control and indicating circuit may consist of two electric valves, one of which is normally maintained nonconductive and which is rendered conductive when an arc-back or reverse current condition exists in the main electric valve. A second electric valve in the control and indicating circuit may be arranged to be maintained nonconductive during normal operation of the main electric valve and may be rendered conductive to control the circuit associated with the main electric valve or to afford an indication of abnormal operation when the main electric valve departs from a predetermined mode or manner of operation. These control and indicating systems may be associated with the excitation circuits for the control members of the main electric valve.

For a better understanding of my invention, together with other and further objects thereof, reference may be had to the following description taken in conjunction with the accompanying drawing, and its scope will be pointed out in the appended claims.

The single figure of the drawing diagrammatically illustrates my invention as applied to an electric translating circuit employing electric valves for transmitting energy between an alternating current supply circuit 1 and a direct current circuit 2. Each of the electric valves 3a, 3b, and 3c, preferably being of the vapor electric type, has an anode 4, a cathode 5, and a control member 6. The alternating current circuit 1 is connected to the anodes of the electric valves 3a, 3b, 3c by means of a circuit interrupting device 7, transformer 8 having primary windings 9 and secondary windings 10 and conductors 10'. The circuit interrupter 7 is diagrammatically shown as being spring biased to the open circuit position and is provided with an electromagnetic tripping arrangement 11. Each of the electric valves 3a, 3b, and 3c is provided with an auxiliary control and indicating circuit 12 which is arranged to indicate an abnormal condition of operation of the associated electric valve. The electric valves 3a, 3b, and 3c are also provided with additional individual indicating circuits 13 which are connected to indicate the occurrence of an arc-back or reverse current in the associated electric valve.

To obtain an indication of an abnormal operating condition of the main electric valves 3a, 3b, and 3c and more particularly to obtain an indication when the electric valves conduct at any time other than during a predetermined interval, each of the control and indicating circuits 12 is provided with an auxiliary electric valve 14 having an anode 15, a cathode 16 and a control electrode 17, an indicating lamp 18, a battery 20 and current responsive and directional means such as a resistance 21. A capacitance 19 is connected between the control electrode 17 and the cathode 16 of electric valve 14 to prevent the valve from operating in response to high frequency transients. During normal operation, a negative potential is impressed upon the control electrode 17 of the auxiliary electric valve 14 by means of the battery 20 and the resistance 21. A positive potential is impressed upon the anode 15 of electric valve 14 by means of any convenient source of potential shown as an electric battery 22 and conductors 23 and 24.

The electric valves 3a, 3b, and 3c are controlled by periodically applying a positive potential to the control member 6 by means of an associated excitation circuit 25 which may comprise a transformer 26, a biasing battery 27 and a current limiting resistance 28. Each of the control and indicating circuits 12 is connected to the associated excitation circuit 25 by means of a resistance 29, conductor 29' and through the above-mentioned resistance 21. Any conventional phase shifting arrangement, such as the rotary phase shifting device 30, may be employed to energize the various excitation circuits 25 through conductors 26' and 26'' at any predetermined selected interval during the positive half cycle of potential applied to the anodes 4 and the cathodes 5 of the electric valves 3a, 3b, and 3c.

The voltage impressed upon the control and indicating circuits 12 by means of the phase shifting arrangement 30 and the conductors 26' and 26'' must have a period equal to and be in phase with the period of conduction of the associated main electric valves 3a, 3b, and 3c so that the voltage impressed upon the excitation circuits 12 by means of the resistances 21 will be reduced in order to maintain on the control electrode 17 of electric valve 14 an effective negative voltage established by the battery 20. In the particular embodiment of the invention illustrated in the drawing, the voltage impressed across the primary winding of transformer 26 and the resistance 29 must be effective for a period of 120 degrees if the main electric valve 3 is rendered conductive for 120 electrical degrees.

During the half cycle of positive potential impressed in the excitation circuit 25 by means of the transformer 26, it should be understood that the potential impressed across the primary winding of transformer 26 and the resistance 29 is negative and increases the negative potential established by battery 20 on the control electrode 17 of valve 14. The voltage impressed across the primary of transformer 26 and the resistance 29 should be considerably smaller than the voltage of battery 20 and the voltage furnished by resistance 21. During the following half cycle, the voltage impressed across the primary winding of transformer 26 and the resistance 29 is in opposition to the voltage of battery 20. It is necessary in order to maintain the valves 14 nonconductive when the main valves 3a, 3b, and 3c are not conducting, that the voltages impressed across the primary of transformers 26 and resistances 29 do not exceed the voltage of the associated battery 20.

The various controlling and indicating circuits 12 are connected in parallel with each other by means of conductors 23 and 24 and are connected in series with the battery 22 and the electroresponsive element 11 of circuit interrupter 7 by means of conductors 24 and 24'. A switch 37, which may be manually or automatically operated, is connected to short circuit the actuating winding of electroresponsive element 11 in the event it is desired to obtain only an indication of an abnormal condition of the electric valves 3 and where it is not desirable to obtain actuation of the circuit interrupter 7 under abnormal conditions. A switch 38 is connected in series with the battery 22 and the various control and indicating circuits 12 to permit resetting of the circuits after an abnormal condition has obtained in the various electric valves.

Each of the individual indicating circuits 13, which indicate arc-back conditions or reverse current conditions in the associated main electric valves 3a, 3b, and 3c, may comprise an electric valve 31 having a control electrode 32, a biasing battery 33, an indicating means such as a lamp 34 and a source of anode-cathode potential such as the battery 35. A capacitance 36 is connected across the control electrode 32 and the cathode of electric valve 31 to reduce transient disturbances in the control circuit for the control electrode 32. During normal operation, that is, for example, when the main electric valve 3a is conducting current in the normal direction, the terminal 21' of resistor 21 will be positive relative to the terminal 21'' so that the potential impressed upon the control electrode 32 of electric valve 31 will be negative relative to the cathode of the valve, thereby maintaining the valve nonconductive during normal operation.

Although I have shown my invention as applied to an electric translating circuit for transmitting energy between an alternating current circuit and a direct current circuit, it should be understood that my invention in its broader aspects may be applied to electric devices and electric translating circuits generally in which it is desirable to obtain an indication when the electric circuit or electric device experiences a departure from a predetermined mode or manner of operation.

The operation of the control and indicating circuits diagrammatically shown in the single figure of the drawing may be explained by considering the electric translating circuit under normal operating conditions. If it be assumed that the electric translating circuit is operating as a half wave rectifier, that is, transmitting energy from the alternating current circuit 1 to the direct current load circuit 2, the electric valves 3a, 3b, and 3c will each conduct unidirectional current for substantially 120 electrical degrees. In other words, each of these valves will be rendered conductive intermittently by the associated control circuits to transmit unidirectional current to the load circuit 2 during predetermined intervals, the direction of positive current through the valve being from the anode to the cathode.

The operation of the control and indicating circuit 12 will first be considered. When, for example, the electric valve 3a is conducting current during the predetermined selected interval, the electric valve 14 will be maintained nonconductive by virtue of the negative potential impressed upon the control electrode 17. This negative potential, if the valve 3a is conducting within the normal predetermined period, is the resultant of two negative potentials and one positive potential. The first negative potential is occasioned by battery 20 and the second negative potential is that due to the voltage impressed across the primary of transformer 26 and the resistance 29 by the device 30 through conductors 26' and 26''. The voltage impressed upon the primary winding of transformer 26 and the resistance 29 by the rotary phase shifting device 30 during this half cycle is in a direction to increase the negative potential impressed upon the control electrode 17 by the battery 20. The positive potential impressed upon the control electrode 17 during the normal operation is that occasioned by the resistance 21. Since current is flowing through the resistance 21 from terminal 21' to terminal 21'', the terminal 21' of resistance 21 will be made positive in potential relative to terminal 21'', tending to impress a positive potential upon the control electrode 17. It should be understood, however, that during the normal period of operation, that is, when the electric valve 3a is conducting in the proper period, the net or resultant potential impressed upon the control electrode 17 will be negative relative to the critical control potential for the particular valve employed. The electric valve 14 may be maintained nonconductive during the period of normal operation by the choice of proper voltages, such as choosing a value of voltage impressed across the primary of winding 26 and resistance 29 which when added to potential of battery 20 will be negative to and have a value greater than that impressed upon the control electrode 17 by the resistance 21. In the manner well understood by those skilled in the art, the main electric valves 3a, 3b, and 3c may be maintained nonconductive during predetermined portions of the cycle of alternating potential applied between the respective anodes and the cathodes of these valves by impressing a negative potential upon the control members 6 by suitable means, such as the battery 27. The valve is rendered conductive by superimposing a positive potential upon the negative potential. This positive potential is obtained in the illustrated embodiment by means of the transformers 26 which are energized through the rotary phase shifting device 30.

If it be assumed that the electric valve 3a conducts current at any other time than during the proper interval, the electric valve 14 will be rendered conductive by the positive potential furnished by resistance 21 resulting in the energization of the lamp 18 to afford an indication of such abnormal operation. The circuit through which the controlling or indicating current flows is cathode 16, conductor 24, the winding of the electroresponsive device 11 of circuit interrupter 7, conductor 24', battery 22, conductor 23, indicating lamp 18 and the anode 15 of electric valve 14. If it is desired to obtain only an indication of such abnormal condition without effecting operation of the circuit interrupter 7, the switch 37 may be closed to short circuit the actuating winding of the circuit interrupter 7. During such abnormal operation, a positive voltage impressed upon the control electrode 17 of electric valve 14 by the resistance 21 will be of sufficient value to overcome the negative voltage impressed upon the control electrode 17 by the battery 20. Since the main valve 3 is conducting current and since the voltage impressed across the primary winding of transformer 26 by the resistance 29 by the device 30 is not available to counteract the positive voltage occasioned by the biasing capacitance 19, the electric valve 14 will be rendered conductive.

Upon the occurrence of the above described abnormal condition or abnormal mode of operation, that is when the main electric valve 3a conducts at any time other than during the proper period, the associated control and indicating circuits will be energized. If the switch 37 is closed so that the electroresponsive element 11 of circuit interrupter 7 is short circuited, the system will operate to afford a visual indication of the occurrence of such abnormal operation. The indicating lamp 18 will be energized from the battery 22. If it is desirable to obtain circuit control in response to such abnormal operation, the switch 37 may be maintained in the open position to effect actuation of the circuit interrupter 7. The circuit through which the energizing current for the electroresponsive device 11 flows is battery 22, conductor 23, indicating lamp 18, through electric valve 14, conductor 24, the actuating winding of the electroresponsive device 11 and the conductor 24'.

It should be understood that the control and indicating circuits 12, in the embodiment of my invention diagrammatically illustrated in the drawing, may be termed a loss-of-control system, inasmuch as this system is responsive to the valve operation when the main electric valves conduct current during any time other than the proper recurring periods established by the excitation circuits 25. For example, in the electric translating circuit illustrated in the drawing, the main electric valves 3a, 3b, and 3c are excited to conduct unidirectional current to the load circuit 2 in a predetermined sequence, preferably corresponding to the order of phase rotation of the positive voltages applied between the anode and cathode of the various electric valves. The various excitation circuits 25 are, of course, energized by means of the rotary phase shifting device 30 to impress suitable periodic voltages upon the control members of the various main electric valves to render these valves conductive in the proper sequence. The control and indicating circuits 12 are associated with the respective excitation circuits 25 to effect circuit control or to afford an indication when the main electric valves conduct in any other sequence than the sequence established by the excitation circuits 25.

Referring now to the individual indicating circuits 13 which are connected to indicate arc-back or reverse current conditions of the associated valves 3a, 3b, and 3c, it should be understood that normally the electric valve 31 is maintained nonconductive by impressing a negative potential upon the control electrode 32 by means of the battery 33. When the main electric valve 3a, for example, is conducting current in the normal direction, that is, in such a direction as to cause the terminal 21' of resistance 21 to be positive relative to the terminal 21'', the voltage impressed upon the control electrode 32 by the resistance 21 is negative and, of course, increases the voltage bias caused by the battery 33. If, however, the electric valve 3a is subject to an arc-back, causing current to flow in the reverse direction, the potential drop across the resistance 21 will be reversed to cause the resistance 21 to impress a positive voltage upon the control electrode 32 of valve 31 of sufficient magnitude to overcome the bias voltage impressed thereon by battery 33. Electric valve 31 is thereby rendered conductive and the indicating lamp 34 is energized from the source 35.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, electric valve means connected in said circuit and comprising a control member for controlling the conductivity thereof, an excitation circuit connected to said control member for rendering said valve means conductive during predetermined intervals comprising a source of alternating voltage, and means associated with said excitation circuit and responsive to said alternating voltage and to the current conducted by said electric valve means for affording an indication when said valve means conducts current at any time other than during said predetermined intervals.

2. In combination, a supply circuit, a load circuit, electric valve means interposed between said circuits and having a control member for controlling the conductivity thereof, an excitation circuit connected to said control member for rendering said valve means conductive during a predetermined interval comprising a source of alternating voltage, and means associated with said excitation circuit and responsive to said alternating voltage and to the current conducted by said electric valve means for controlling the energization of said valve means when said valve means conducts current at any time other than during the period established by said excitation circuit.

3. In combination, a supply circuit, a load circuit, electric valve means interposed between said circuits and having a control member for controlling the conductivity thereof, an excitation circuit connected to said control member for rendering said valve means conductive during a predetermined interval comprising a source of alternating voltage, and means comprising an auxiliary source of electrical energy, an electric valve and a control circuit responsive to said alternating voltage and to the current conducted by said electric valve means for controlling the energization of said valve means and being connected to be energized from said auxiliary source through said second mentioned electric valve when said valve means conducts at any time other than the interval established by said excitation circuit.

4. In combination, a supply circuit, a load circuit, electric valve means interposed between said circuits and having a control member for controlling the conductivity thereof, an excitation circuit connected to said control member and comprising a source of alternating voltage for maintaining said valve means nonconductive during a predetermined interval and for rendering said valve means conductive during a succeeding interval, and means responsive to said alternating voltage and to the current conducted by said electric valve means comprising an electric valve associated with said excitation circuit for controlling the energization of said valve means when said valve means conducts at any time other than the interval established by said excitation circuit.

5. In combination, a supply circuit, a load circuit, electric valve means interposed between said circuits and having a control member for controlling the conductivity thereof, an excitation circuit connected to said control member comprising a source of alternating voltage for rendering said valve means conductive during predetermined intervals, a control and indicating circuit for controlling the energization of said valve means, an electric valve having a control electrode for controlling the energization of said control and indicating circuit, means responsive to said alternating voltage and to the current conducted by said electric valve means for impressing a potential upon the control electrode of said second-mentioned electric valve to maintain said valve nonconductive during normal operation of said electric valve means and for impressing a potential upon said control electrode to render said second-mentioned valve conductive when said electric valve means conducts at any time other than the interval established by said excitation circuit.

6. In combination, a supply circuit, a load circuit, main electric valve means interposed between said circuits, a control circuit for controlling the energization of said valve means comprising an auxiliary electric valve having a control member, a source of potential for maintaining said auxiliary valve normally nonconductive by impressing a negative potential on said control member, current responsive means for impressing a positive potential on said control member tending to render said auxiliary electric valve conductive when said main electric valve means conducts current, and an excitation circuit for said main valve means and being associated with said control circuit for controlling the conductivity of said main valve means in accordance with a predetermined mode of operation and for impressing on said control member a potential to render ineffective said positive potential of said current responsive means only when said main valve means conducts according to said predetermined mode of operation.

7. In combination, a supply circuit, a load circuit, main electric valve means interposed between said circuits, a control circuit for controlling the energization of said valve means comprising an auxiliary electric valve having a control member, a source of potential for maintaining said auxiliary valve normally nonconductive by impressing on said control member a negative potential, current responsive means comprising a resistance for impressing a positive potential on said control member tending to render said auxiliary electric valve conductive when said main valve means conducts current in a predetermined direction, and an excitation circuit for said main valve means and being associated with said control circuit for controlling the conductivity of said main valve means in accordance with a predetermined mode of operation and for impressing on said control member a potential being in phase with and having a period equal to the period of conductivity of said main electric valve means to render ineffective the positive potential of said current responsive means only when said main valve means conducts according to said predetermined mode of operation.

KENNETH H. KINGDON.